US010130944B2

(12) United States Patent
Zheng et al.

(10) Patent No.: US 10,130,944 B2
(45) Date of Patent: *Nov. 20, 2018

(54) RARE EARTH-CONTAINING Y ZEOLITE AND A PREPARATION PROCESS THEREOF (71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jinyu Zheng, Beijing (CN); Yibin Luo, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 790 days.

This patent is subject to a terminal disclaimer.

(21) Appl. No.: 14/411,797

(22) PCT Filed: Jun. 27, 2013

(86) PCT No.: PCT/CN2013/000768
§ 371 (c)(1),
(2) Date: Dec. 29, 2014

(87) PCT Pub. No.: WO2014/000422
PCT Pub. Date: Jan. 3, 2014

(65) Prior Publication Data
US 2015/0158025 A1 Jun. 11, 2015

(30) Foreign Application Priority Data
Jun. 27, 2012 (CN) .......................... 2012 1 0218361

(51) Int. Cl.
B01J 29/08 (2006.01)
B01J 37/30 (2006.01)
(Continued)

(52) U.S. Cl.
CPC ............. B01J 37/30 (2013.01); B01J 29/088 (2013.01); C01B 39/026 (2013.01); C01B 39/24 (2013.01)

(58) Field of Classification Search
None
See application file for complete search history.

(56) References Cited

U.S. PATENT DOCUMENTS 4,125,591 A 11/1978 Lindsley
4,459,271 A 7/1984 Lim et al.
(Continued)

FOREIGN PATENT DOCUMENTS

CN 1053808 A 8/1991
CN 1026225 C 10/1994
(Continued)

OTHER PUBLICATIONS

English Translation of Zheng et al, CN 103130240, from Google Patents (Year: 2013).*
(Continued)

Primary Examiner — Colin W. Slifka
(74) Attorney, Agent, or Firm — Novick, Kim & Lee, PLLC; Allen Xue (57) ABSTRACT The present invention provides a rare earth-containing Y zeolite and a preparation process thereof, said rare earth-containing Y zeolite has a rare earth content as rare earth oxide of 10-25 wt %, a unit cell size of 2.440-2.472 nm, a crystallinity of 35-65%, a Si/Al atom ratio in the skeleton of 2.5-5.0; and a product of the ratio of the strength $I_1$ of the peak at $2\theta=11.8\pm0.1°$ to the strength $I_2$ of the peak at
(Continued)

2θ=12.3±0.1° in the X-ray diffraction spectrogram of the zeolite and the weight percent of rare earth as rare earth oxide in the zeolite of higher than 48.

18 Claims, 2 Drawing Sheets

(51) Int. Cl.
  *C01B 39/02* (2006.01)
  *C01B 39/24* (2006.01)

(56) References Cited

U.S. PATENT DOCUMENTS

| | | | |
|---|---|---|---|
| 4,556,478 | A | 12/1985 | Shioiri et al. |
| 4,584,287 | A | 4/1986 | Ward |
| 7,776,775 | B2 | 8/2010 | Du et al. |
| 9,656,255 | B2 * | 5/2017 | Long ............... B01J 29/0308 |

FOREIGN PATENT DOCUMENTS

| | | |
|---|---|---|
| CN | 1069553 C | 8/2001 |
| CN | 1317547 A | 10/2001 |
| CN | 1382631 A | 12/2002 |
| CN | 1436727 A | 8/2003 |
| CN | 1506161 A | 6/2004 |
| CN | 1624079 A | 6/2005 |
| CN | 1676463 A | 10/2005 |
| CN | 1951814 A | 4/2007 |
| CN | 100344374 C | 10/2007 |
| CN | 101081369 A | 12/2007 |
| CN | 101147875 A | 3/2008 |
| CN | 101250428 A | 8/2008 |
| CN | 101537366 A | 9/2009 |
| CN | 101823726 A | 9/2010 |
| CN | 103130240 A | 6/2013 |
| EP | 0421422 A2 | 4/1991 |
| JP | S5080288 A | 6/1975 |
| JP | 2006521266 A | 9/2006 |
| RU | 2229933 C1 | 6/2004 |
| RU | 2300420 C2 | 6/2007 |
| RU | 2317143 C2 | 2/2008 |

OTHER PUBLICATIONS

Russian Federation Federal Service for Intellectual Property (ROSPATENT), Decision on grant of patent for invention dated Jan. 20, 2017.
Kozlov N.S. et al., "Ultrastable Zeolites", Minsk, 1979, p. 8 to 43.
Xionghou Gao et al. "High Silica REHY zeolite with low rare earth loading as high-performance catalyst for heavy oil conversion" Applied Catalysis A: General, 413-414 (2012) pp. 254-260.
Shan-Qing Yu et al. "Mechanism of Rare Earth Cations on the Stability and Acidity of Y Zeolites" Acta Physico-Chimica Sinica, Aug. 26, 2011, pp. 2528-2534.
Robert C.T. Slade et al. "Conductivity variations in hydrated lanthanum-exchanged zeolites X, Y and A" Solid State Ionics, 57, Jul. 1, 1992, pp. 177-182.
Jianhua Shen et al. "The influence of calcining with steam on hydrothermal stability of zeolite REY molecular sieve" Petrochemical Technology, 1996, vol. 25, No. 5, pp. 325-329.
Cassandra Mitchell et al., Australian patent application No. 2013284233 examination report and search report, dated Jan. 18, 2016.
Sevillano Rodrigues, EP 13810624 search report, dated Mar. 16, 2016.

* cited by examiner

RARE EARTH-CONTAINING Y ZEOLITE AND A PREPARATION PROCESS THEREOF

TECHNICAL FIELD

The present invention relates to a rare earth-containing Y zeolite and a preparation process thereof.

BACKGROUND OF THE INVENTION

Fluid catalytic cracking (FCC) is an important process for the petroleum refinement. In china, about 70-80% of gasoline is obtained from the FCC process. Due to the increased environmental awareness and the continuing issuance of the stricter environment protection regulations and the stricter emission standard, the requirement on the quality of FCC gasoline is being increased, especially for the olefin content. Therefore there is a need in the art for a catalytic cracking catalyst having a capability of reducing the olefin content.

The currently used active component for reducing the olefin content in gasoline is mostly the rare earth-containing Y zeolite. References can be made to CN1317547A, CN1506161A, CN101537366A, CN1436727A, CN1382631A, CN101823726A, CN100344374C, CN1053808A, CN1069553C, CN1026225C, and CN101147875A.

For example, CN101147875A discloses a catalytic cracking catalyst, which contains a high rare earth ultra stable Y zeolite. Said high rare earth ultra stable Y zeolite is prepared as follows. An ultra stable Y zeolite used as starting material is mixed with an acid. The mixture is stirred, washed and filtered. To the mixture is added a solution of rare earth salt to conduct an exchange. Then the mixture is washed, filtered and dried. The product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of said high rare earth ultra stable Y zeolite and the rare earth content in the zeolite ($RE_2O_3\%$) is not higher than 40.

The rare earth-containing Y zeolite can be prepared through a one-exchange-and-one-calcination procedure (the ion exchange is conducted once and the high temperature calcination is conducted once, references can be made to, for example, CN1436727A, CN101823726A and CN100344374C), or a two-exchange-and-two-calcination procedure (the liquid-phase rare earth ion exchanges are conducted twice and the high temperature calcinations are conducted twice, references can be made to, for example, CN1506161A and CN101537366A).

For either the prior two-exchange-and-two-calcination procedure or the prior one-exchange-and-one-calcination procedure, in the preparation of the rare earth-containing Y zeolite, the amount of rare earth in the product is usually lower than the total fed amount of rare earth. Even if many rare earth ions are located in sodalite cages, it is inevitable that some rare earth ions are still present in super cages. The rare earth ions in super cages can be backwashed off in the subsequent washing procedures, resulting in the loss of rare earth and the decrease of the rare earth utilization.

In the current industry, for saving the production cost and increasing the product efficiencies, upon the preparation of the Y zeolite having high rare earth content, a two-exchange-and-one-calcination procedure is mostly used. That is to say, after the first calcination, the rare earth exchange is conducted once more, but the second calcination is not done. Due to the lack of the second calcination, the effective migration of rare earth ions cannot be achieved, and most of rare earth ions are still present in super cages. The rare earth ions in super cages can be backwashed off in the subsequent washing procedures, also resulting in the decrease of the rare earth utilization.

SUMMARY OF THE INVENTION

Therefore, an object of the present invention is to aim at the shortcomings in the prior art, and based on the prior art, provide a Y zeolite, which is different from those in the prior art and has good structure and activity stability, and high rare earth utilization. Another object of the present invention is to provide a process for preparing the rare earth-containing Y zeolite, which process has a short technological flow and a low production cost, and is able to produce the rare earth-containing Y zeolite having good structure and activity stability, and high rare earth utilization.

Based on a large quantity of the experiments on the preparation of the rare earth-containing Y zeolite, the present inventors have found that the process combining the two-exchange-and-two-calcination of NaY zeolite with the deposition of rare earth results in a rare earth-containing Y zeolite that has a specific physiochemical property. The new rare earth-containing Y zeolite is superior in the rare earth utilization and the zeolite structure stability. In particular, based on a large quantity of experiment data, it has been surprisingly found that there exists a unique relationship between the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the resulting rare earth-containing Y zeolite and the rare earth content in the zeolite ($RE_2O_3\%$). Based on this, the present invention is achieved.

In an aspect of the present invention, the present invention provides a rare earth-containing Y zeolite, which is characterized in that, the rare earth content as rare earth oxide is 10-25 wt %, e.g. 11-23 wt %, the unit cell size is 2.440-2.472 nm, e.g. 2.450-2.470 nm, the crystallinity is 35-65%, e.g. 40-60%, the Si/Al atom ratio in the skeleton is 2.5-5.0, the product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the zeolite and the weight percent of rare earth as rare earth oxide in the zeolite is higher than 48. The rare earth-containing Y zeolite of the present invention has a crystallinity retention after 17 hours of aging treatment at 800° C. in a condition of 100% steam of greater than 40%, e.g. greater than 45%.

In another aspect of the present invention, the present invention provides a process for preparing a rare earth-containing Y zeolite. The preparation process is a process combining the two-exchange-and-two-calcination procedure with the deposition of rare earth.

Specifically, the present invention provides the following technical solutions:

1. A rare earth-containing Y zeolite, which has a rare earth content as rare earth oxide of 10-25 wt %, e.g. 11-23 wt %; a unit cell size of 2.440-2.472 nm, e.g. 2.450-2.470 nm; a crystallinity of 35-65%, e.g. 40-60%; a Si/Al atom ratio in the skeleton of 2.5-5.0; and a product of the ratio of the strength $I_1$ of the peak at $2\theta=11.8\pm0.1°$ to the strength $I_2$ of the peak at $2\theta=12.3\pm0.1°$ in the X-ray diffraction spectrogram of the zeolite and the weight percent of rare earth as rare earth oxide in the zeolite of higher than 48, e.g. higher than 55.

2. The rare earth-containing Y zeolite according to the technical solution 1, wherein said rare earth-containing Y zeolite has a crystallinity retention after 17 hours of aging treatment at 800° C. in a condition of 100% steam of greater than 40%, e.g. greater than 45%.

3. A process for preparing a rare earth-containing Y zeolite, which comprises the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1) is subjected to a first calcination to obtain a rare earth- and sodium-containing Y zeolite;
(3) then either the rare earth- and sodium-containing Y zeolite obtained in step (2) is contacted with an ammonium salt solution or an acid solution, and then mixed with a rare earth solution, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3) is subjected to a second calcination to obtain the target rare earth-containing Y zeolite.

4. A process for preparing a rare earth-containing Y zeolite, which comprises the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) then either the rare earth- and sodium-containing Y zeolite obtained in step (2) is contacted with an ammonium salt solution, and then mixed with a rare earth solution without filtration, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3), after being filtered and washed with water, and dried, is subjected to a second calcination to obtain the target rare earth-containing Y zeolite.

5. A process for preparing a rare earth-containing Y zeolite, which comprises the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) the rare earth- and sodium-containing Y zeolite obtained in step (2) is contacted with an ammonium salt solution or an acid solution, filtered, and then mixed with a rare earth solution, and the mixture is adjusted to a pH of 6-10, to obtain a rare earth- and sodium-containing Y zeolite;
(4) the rare earth- and sodium-containing Y zeolite obtained in step (3), after being optionally filtered and washed with water, and dried, is subjected to a second calcination to obtain the target rare earth-containing Y zeolite.

6. The process according to any one of the technical solutions 3-5, wherein the ammonium salt is selected from the group consisting of ammonium chloride, ammonium nitrate, ammonium carbonate, ammonium hydrogen carbonate and any mixture thereof.

7. The process according to any one of the technical solutions 3-5, wherein in step (1), the weight ratio of the rare earth solution (as rare earth oxide) to the NaY zeolite (on the dry basis) is 0.06-0.14, e.g. 0.07-0.12, the weight ratio of the ammonium salt (as ammonium chloride) to the rare earth solution (as rare earth oxide) is 0-10, e.g. 0-5, such as 0.2-3, said ammonium salt is selected from the group consisting of ammonium chloride, ammonium nitrate, ammonium carbonate, ammonium hydrogen carbonate and any mixture thereof, the pH is adjusted to 3.0-5.0, the weight ratio of water:zeolite is controlled to 5-30, e.g. 7-15, said contact is conducted at room temperature (such as 18-26° C.) to 100° C., e.g. 70-95° C. for at least 0.3 hour, e.g. 0.5-3 hours, such as 0.5-1.5 hours.

8. The process according to any one of the technical solutions 3-5, wherein in step (2), said first calcination is conducted at 500-650° C., e.g. 530-630° C., such as 550-620° C., in a condition of 0-100% steam for at least 0.5 hour, e.g. 0.5-4.0 hours, 1.0-4.0 hours or 1.5-3.0 hours.

9. The process according to any one of the technical solutions 3-5, wherein in step (3), for the case of contacting the rare earth- and sodium-containing Y zeolite with the ammonium salt solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the ammonium salt solution, the weight ratio of the zeolite (dry basis):ammonium salt:water is 1:(0.05-0.5):(5-30), e.g. 1:(0.1-0.4):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said ammonium salt is selected from the group consisting of ammonium chloride, ammonium nitrate, ammonium carbonate, ammonium hydrogen carbonate and any mixture thereof;

for the case of contacting the rare earth- and sodium-containing Y zeolite with the acid solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the acid solution, the weight ratio of zeolite (dry basis):acid:water is 1:(0.03-0.2):(5-30), e.g. 1:(0.05-0.1):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said acid can be an inorganic acid or an organic acid, the inorganic acid can be selected from the group consisting of sulphuric acid, hydrochloric acid, nitric acid and any mixture thereof, the organic acid can be selected from the group consisting of oxalic acid, acetic acid, citric acid, tartaric acid, and any mixture thereof; for the case of contacting the rare earth- and sodium-containing Y zeolite with the mixed solution of ammonium salt and rare earth solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite, the ammonium salt, and the rare earth solution, the weight ratio of zeolite (dry basis):ammonium salt:rare earth oxide ($RE_2O_3$):water is 1:(0.05-0.5):(0.01-0.2):(5-30), preferably 1:(0.1-0.4):(0.02-0.12):(8-15); said ammonium salt is selected from the group consisting of ammonium chloride, ammonium nitrate, ammonium carbonate, ammonium hydrogen carbonate and any mixture thereof.

10. The process according to the technical solution 9, wherein in step (3), after the contact, the mixture is adjusted with an alkaline liquid to a pH of 6-10, e.g. 7-9, such as 7.5-8.2.
11. The process according to the technical solution 10, wherein said alkaline liquid can be selected from the group consisting of aqueous ammonia, sodium silicate, sodium metaaluminate, sodium hydroxide and any mixture thereof.
12. The process according to any one of the technical solutions 3-5, wherein in step (4), said second calcination is conducted at 500-650° C., in a condition of 0-100% steam for 0.5-4 hours, e.g. 1-3 hours.

DESCRIPTION OF PREFERRED EMBODIMENTS

According to the present invention, the utilization efficiency of the rare earth starting material can be shown by rare earth utilization. The rare earth utilization refers to a ratio of the rare earth amount as rare earth oxide ($RE_2O_3$) in the product to the theoretical rare earth feeding amount as rare earth oxide ($RE_2O_3$), as a weight percent. The rare earth-containing Y zeolite of the present invention has a rare earth utilization of higher than 98%.

The Si/Al atom ratio in the skeleton according to the present invention refers to the atomic molar ratio of Si and Al in the rare earth-containing Y zeolite of the present invention. There also several measurements for the Si/Al ratio. For example, the Si/Al ratio can be obtained by the measurement for crystal cell parameter s with X-ray diffraction and calculation, or by the infrared spectroscopy, or by the nuclear magnetic resonance (NMR) measurement and calculation. In the present invention, the Si/Al atom ratio in the skeleton is obtained by the nuclear magnetic resonance (NMR) measurement and calculation. The Si/Al ratio of the zeolite mentioned in the present invention refers to the Si/Al atom ratio in the skeleton of the zeolite.

For the rare earth-containing Y zeolite, in its X-ray diffraction spectrogram, the peak at $2\theta=11.8\pm0.1°$ can be used to characterize the rare earth distribution in the sodalite cage, and $I_1$ is used to represent its peak strength; the peak at $2\theta=12.3\pm0.1°$ can be used to characterize the rare earth distribution in the super cage, and $I_2$ is used to represent its peak strength; the ratio of $I_1$ to $I_2$ can be used to characterize the migration degree of rare earth ions from the super cages to the sodalite cages. According to the present invention, the peak strength is a relative strength relative to a peak-forming plane (in other words, the peak strength is a peak strength subtracting the base line strength). For example, if the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of a rare earth-containing zeolite is 5, and the weight percent of rare earth as rare earth oxide in the zeolite is 10%, then the product is 5×10=50. The product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the rare earth-containing Y zeolite of the present invention and the weight percent of rare earth as rare earth oxide in the zeolite is higher than 48. According to the present invention, the upper limit of that product is not limited, for example, the upper limit can be 200, e.g. 100. In a preferable embodiment of the present invention, the range of that product is 48-200, e.g. 48-100. More preferably, that product is higher than 55, higher than 60, higher than 70, e.g. 55-200, such as 55-90.

According to the present invention, said crystallinity retention is the ratio of the crystallinity of the sample after the aging treatment to that before the aging treatment, wherein the aging treatment comprises: mixing the zeolite and an ammonium chloride solution to exchange until the content of $Na_2O$ is below 0.3 wt %, then filtering, drying, and aging at 800° C. in a condition of 100% steam for 17 hours; if the zeolite has a $Na_2O$ content of below 0.3 wt %, then directly aging at 800° C. in a condition of 100% steam for 17 hours without the exchange, filtering and drying.

In an aspect of the present invention, the rare earth-containing Y zeolite of the present invention is characterized in that, the rare earth content as rare earth oxide is 10-25 wt %, e.g. 11-23 wt %, the unit cell size is 2.440-2.472 nm, e.g. 2.450-2.470 nm, the crystallinity is 35-65%, e.g. 40-60%, the Si/Al atom ratio in the skeleton is 2.5-5.0, the product of the ratio of the strength $I_1$ of the peak at $2\theta=11.8\pm0.1°$ to the strength $I_2$ of the peak at $2\theta=12.3\pm0.1°$ ($I_1/I_2$) in the X-ray diffraction spectrogram of the zeolite and the weight percent of rare earth as rare earth oxide in the zeolite is higher than 48. The rare earth-containing Y zeolite of the present invention has a crystallinity retention after 17 hours of aging treatment at 800° C. in a condition of 100% steam of greater than 40%, e.g. greater than 45%.

In another aspect of the present invention, the present invention provides a process for preparing a rare earth-containing Y zeolite. The preparation process is a process combining the two-exchange-and-two-calcination with the deposition of rare earth.

In an embodiment of the present invention, the process for preparing the rare earth-containing Y zeolite of the present invention comprises the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1) is subjected to a first calcination to obtain a rare earth- and sodium-containing Y zeolite;
(3) then either the rare earth- and sodium-containing Y zeolite obtained in step (2) is contacted with an ammonium salt solution or an acid solution, and then mixed with a rare earth solution, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3) is subjected to a second calcination to obtain the target rare earth-containing Y zeolite.

In another embodiment of the present invention, the process for preparing the rare earth-containing Y zeolite of the present invention comprises the following steps:

(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) then either the rare earth- and sodium-containing Y zeolite obtained in step (2) is contacted with an ammonium salt solution, and then mixed with a rare earth solution without filtration, and the mixture is adjusted to a pH of 6-10, or the rare earth- and sodium-containing Y zeolite obtained in step (2) is contacted with a mixed solution of ammonium salt and rare earth solution, and then the mixture is adjusted to a pH of 6-10, to obtain a rare earth- and sodium-containing Y zeolite;
(4) the rare earth- and sodium-containing Y zeolite obtained in step (3), after being filtered and washed with water, and dried, is subjected to a second calcination to obtain the target rare earth-containing Y zeolite.

In another embodiment of the present invention, the process for preparing the rare earth-containing Y zeolite of the present invention comprises the following steps:
(1) a NaY zeolite and a rare earth solution or a mixed solution of ammonium salt and rare earth solution are contacted to obtain a rare earth- and sodium-containing Y zeolite;
(2) the rare earth- and sodium-containing Y zeolite obtained in step (1), after being filtered and washed with water, and dried, is subjected to a first calcination to obtain a rare earth- and sodium-containing Y zeolite;
(3) the rare earth- and sodium-containing Y zeolite obtained in step (2) is contacted with an ammonium salt solution or an acid solution, filtered, and then mixed with a rare earth solution, and the mixture is adjusted to a pH of 6-10, to obtain a rare earth- and sodium-containing Y zeolite;
(4) the rare earth- and sodium-containing Y zeolite obtained in step (3), after being optionally filtered and washed with water, and dried, is subjected to a second calcination to obtain the target rare earth-containing Y zeolite.

According to the preparation process of the present invention, the NaY zeolite as starting material has a Si/Al atom ratio in the skeleton of preferably >2.5 and a crystallinity of >80%.

According to the preparation process of the present invention, the ammonium salt is selected from the group consisting of ammonium chloride, ammonium nitrate, ammonium carbonate, ammonium hydrogen carbonate and any mixture thereof.

In step (1) of the process for preparing the rare earth-containing Y zeolite, the weight ratio of the rare earth solution (as rare earth oxide) to the NaY zeolite (on the dry basis) is 0.06-0.14, e.g. 0.07-0.12, the weight ratio of the ammonium salt (as ammonium chloride) to the rare earth solution (as rare earth oxide) is 0-10, e.g. 0-5, such as 0.2-3, said ammonium salt is selected from the group consisting of ammonium chloride, ammonium nitrate, ammonium carbonate, ammonium hydrogen carbonate and any mixture thereof, the pH is adjusted to 3.0-5.0, the weight ratio of water:zeolite is controlled to 5-30, e.g. 7-15, said contact is conducted at room temperature (such as 18-26° C.) to 100° C., e.g. 70-95° C. for at least 0.3 hour, e.g. 0.5-3 hours, such as 0.5-1.5 hours.

In step (2) of the process for preparing the rare earth-containing Y zeolite, said first calcination is conducted at 500-650° C., e.g. 530-630° C., such as 550-620° C., in a condition of 0-100% steam for at least 0.5 hour, e.g. 0.5-4.0 hours, 1.0-4.0 hours or 1.5-3.0 hours. The calcination can promote the migration of rare earth ions from the super cages of the zeolite to the sodalite cages. The first calcination is preferably conducted in a condition of 1-100%, preferably 20-100%, more preferably 100% steam.

In step (3) of the process for preparing the rare earth-containing Y zeolite, for the case of contacting the rare earth- and sodium-containing Y zeolite with the ammonium salt solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the ammonium salt solution, the weight ratio of the zeolite (dry basis):ammonium salt:water is 1:(0.05-0.5):(5-30), e.g. 1:(0.1-0.4):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said ammonium salt is selected from the group consisting of ammonium chloride, ammonium nitrate, ammonium carbonate, ammonium hydrogen carbonate and any mixture thereof;

for the case of contacting the rare earth- and sodium-containing Y zeolite with the acid solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite and the acid solution, the weight ratio of zeolite (dry basis):acid:water is 1:(0.03-0.2):(5-30), e.g. 1:(0.05-0.1):(8-15); the rare earth solution is subsequently added in such an amount that the weight ratio of the rare earth element (as rare earth oxide ($RE_2O_3$)) in the rare earth solution to the rare earth- and sodium-containing Y zeolite (on a dry basis of the zeolite) is 0.01-0.2, e.g., 0.02-0.12; said acid can be an inorganic acid or an organic acid, the inorganic acid can be selected from the group consisting of sulphuric acid, hydrochloric acid, nitric acid and any mixture thereof, the organic acid can be selected from the group consisting of oxalic acid, acetic acid, citric acid, tartaric acid, and any mixture thereof; for the case of contacting the rare earth- and sodium-containing Y zeolite with the mixed solution of ammonium salt and rare earth solution, the contact is conducted at room temperature to 100° C., e.g. 60-80° C. for at least 0.3 hour, e.g. 0.3-3.0 hours, 0.5-3 hours or 0.5-1.5 hours, wherein for the proportions of the rare earth- and sodium-containing Y zeolite, the ammonium salt, and the rare earth solution, the weight ratio of zeolite (dry basis):ammonium salt:rare earth oxide ($RE_2O_3$):water is 1:(0.05-0.5):(0.01-0.2):(5-30), e.g. 1:(0.1-0.4):(0.02-0.12):(8-15); said ammonium salt is selected from the group consisting of ammonium chloride, ammonium nitrate, ammonium carbonate, ammonium hydrogen carbonate and any mixture thereof;

After the above contact, the mixture is adjusted with an alkaline liquid to a pH of 6-10, preferably 7-9, and more preferably 7.5-8.2, so that all of rare earth ions deposit to form rare earth hydroxide, i.e. the deposition of rare earth. The time is not particularly limited, for example, 5 minutes to 2 hours, e.g 10 minutes to 60 minutes, 10 minutes to 30 minutes. Said alkaline liquid can be selected from the group consisting of aqueous ammonia, sodium silicate, sodium metaaluminate, sodium hydroxide and any mixture thereof.

In step (4) of the process for preparing the rare earth-containing Y zeolite, said second calcination is conducted at 500-650° C., in a condition of 0-100% steam for 0.5-4 hours, e.g. 1-3 hours. The second calcination is preferably conducted in a condition of 1-100%, preferably 20-100%, more preferably 100% steam.

The various conditions listed in the above steps (1) to (4) (including the preferable conditions and exemplified conditions) can be combined to obtain a technical solution, which is also in the scope of the present invention.

According to the preparation process of the present invention, rare earth is selected from the group consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), scandium (Sc) and yttrium (Y). Preferably, rare earth is selected from the group consisting of lanthanum (La) and cerium (Ce). The rare earth starting material can be provided in a form of soluble salt such as nitrate and hydrochloride. The rare earth starting material can be a rare earth chloride or a rare earth nitrate containing a single rare earth element, such as lanthanum chloride, lanthanum nitrate, cerium chloride, and cerium nitrate, and also can be a mixed rare earth material having a various rare earth element ratio, such as a cerium-rich or lanthanum-rich mixed rare earth material. For example, said rare earth solution can be a solution containing one or more of lanthanum nitrate, cerium nitrate, lanthanum chloride, cerium chloride, a mixed rare earth nitrate, and a mixed rare earth chloride, wherein the mixed rare earth nitrate refers to (REx1REx2 . . . RExn)(NO3)3, wherein REx1, REx2, . . . , RExn refer to rare earth elements, wherein n is an integer of 2 or more, the sum of x1+x2+ . . . +xn equals to 1; a mixed rare earth chloride (also named rare earth chloride) refers to (REy1REy2 . . . REyn)Cl3, wherein REy1, REy2, . . . , REyn refer to rare earth elements, wherein n is an integer of 2 or more, the sum of y1+y2+ . . . +yn equals to 1.

According to the preparation process of the present invention, the rare earth-containing Y zeolite is prepared through one liquid phase exchange of rare earth ions and one solid-phase migration of rare earth ions. The process having the rare earth exchange and the rare earth deposition in combination with two calcinations ensure few or no loss of rare earth and the migration of rare earth ions from the super cages to the sodalite cages. The rare earth content can be flexibly adjusted and accurately controlled, and the operation is simple. Furthermore, in the second exchange using an ammonium salt, after contacting with the ammonium salt and before the deposition of rare earth, the filtering step can be omitted. Therefore, the preparation process is shortened and the loss of rare earth can be further reduced. According to the present invention, the earth utilization can be up to 98% or more. The rare earth resource is effectively saved and the production cost is further decreased.

The rare earth-containing Y zeolites obtained according to the prior method (such as those in CN1053808A and CN100344374C, or the conventional industrial two-exchange-and-two-calcination procedure) have a crystallinity retention after 17 hours of aging treatment at 800° C. in a condition of 100% steam of less than 40%. On the contrary, the rare earth-containing Y zeolite of the present invention has a higher crystallinity retention after 17 hours of aging treatment at 800° C. in a condition of 100% steam, e.g. greater than 40%, e.g. greater than 45%, which shows good structure stability. Therefore, in comparison with the prior art, the rare earth-containing Y zeolite of the present invention has good structure stability. The rare earth-containing Y zeolite of the present invention has good activity stability (high light oil micro-activity (MA) value). When the rare earth-containing Y zeolite of the present invention is used as the active component of the catalyst, the used amount in the catalyst can be reduced and the catalyst production cost can be decreased.

EXAMPLES

Hereinafter, the present invention will be further illustrated with the examples, but the scope of the present invention is not limited thereto.

According to the present invention, the chemical composition of the zeolite is determined by X-ray fluorescence spectrometry. A reference can be made to Analytical Methods in Petrochemical Industry (RIPP Experiment Techniques), Yang Cuiding et. al, Science Press, 1990.

The phase data (such as the unit cell size) and the crystallinity data of the molecular size are determined by X-ray diffraction according to the standard methods RIPP145-90 and RIPP146-90 respectively. A reference can be made to Analytical Methods in Petrochemical Industry (RIPP Experiment Techniques), Yang Cuiding et. al, Science Press, 1990.

The Si/Al atom ratio in the skeleton of the zeolite is obtained by the nuclear magnetic resonance (NMR) measurement and calculation.

The light oil micro-activity (MA) is measured according to the standard method RIPP92-90.

In the Examples and Comparative Examples, the used starting materials are commercially available and their detailed specifications are as follows.

NaY zeolite, industrial grade, available from Sinopec Catalyst Company, Qilu Division. Rare earth chloride: industrial grade, available from Sinopec Catalyst Company, Qilu Division, the mass ratio of lanthanum (as $La_2O_3$):cerium (as Ce2O3)=55:45; Others: chemically pure.

Example 1

2.6 kg NaY zeolite (Qilu catalyst company, calcination loss by 22.5 wt %, Si/Al ratio 2.7, crystallinity 88%, the same below) and 15 kg deionized water were mixed and pulped. To the mixture were added 1.0 L of the rare earth chloride solution having a concentration of 160 $gRE_2O_3/L$ and 0.24 kg ammonium chloride solid. After stirring, the slurry was warmed up to 70° C. and the slurry was adjusted with a diluted hydrochloric acid to a pH of 4.0, continued to exchange for 1.5 hours, filtered, water-washed, dried, then calcined in a condition of 100% steam at 550° C. for 2 hours to obtain the "one-exchange-and-one-calcination" rare earth- and sodium-containing Y zeolite Y-A1, Y-A1 having the following chemical composition: $Na_2O$ 5.1 wt %, rare earth oxide 7.8 wt %. Then a slurry was formulated and pulped in a ratio of zeolite:$NH_4Cl:H_2O$=1:0.2:10 and exchanged at 70° C. for 1 hour. To the slurry was added 0.27 L of the rare earth chloride solution having a concentration of 300 $gRE_2O_3/L$. The slurry was stirred evenly. To the slurry was added aqueous ammonia, and the slurry was adjusted to a pH of 7.5 and the stirring was continued for 10 minutes, filtered, water-washed, dried, then calcined in a condition of 100% steam at 600° C. for 2 hours to obtain the present rare earth-containing Y zeolite product, named as Y-A.

Figure 1:
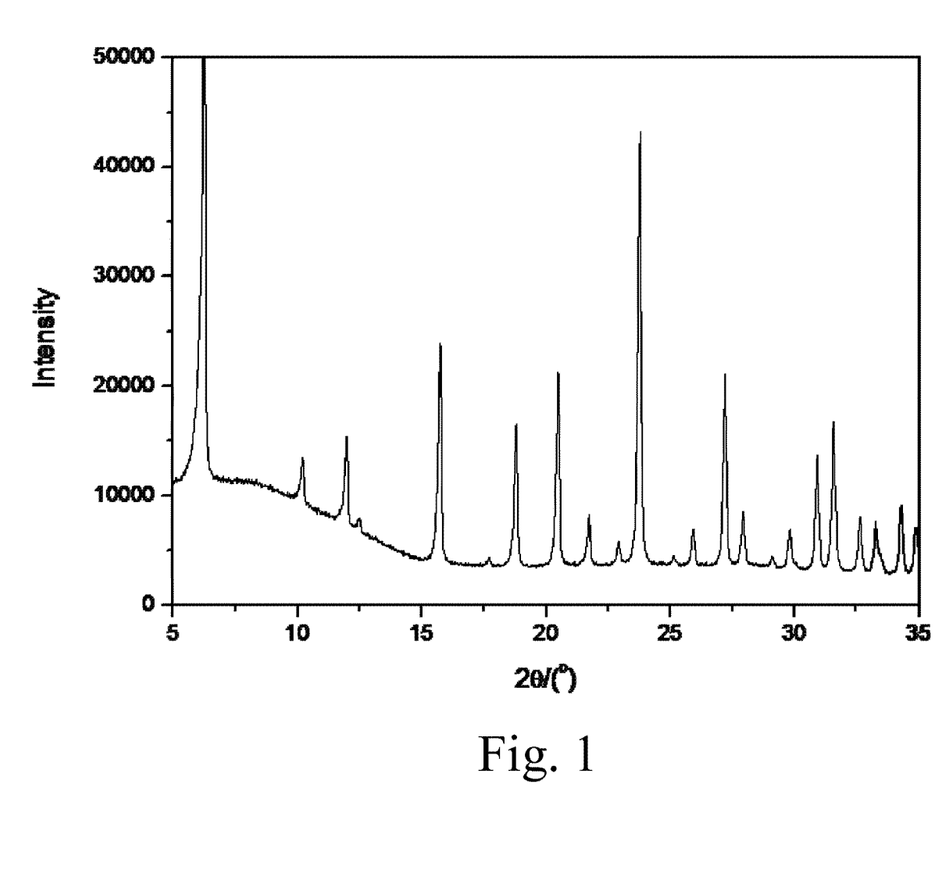
FIG. 1 is an X-ray diffraction spectrogram of the rare earth-containing Y zeolite prepared according to Example 1.

The X-ray diffraction spectrogram of Y-A was shown in FIG. 1.

Y-A: $Na_2O$ 1.5 wt %, rare earth oxide 11.9 wt %, crystallinity 50.1%, unit cell size 2.458 nm, the Si/Al atom ratio in the skeleton 3.5. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 90.0.

Example 2

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in air at 570° C. for 2 hours to obtain the "one-exchange-and-one-calcination" rare earth- and sodium-containing Y zeolite Y-B1, Y-B1 having the following chemical composition: Na$_2$O 4.9 wt %, rare earth oxide 9.9 wt %. Then a slurry was formulated and pulped in a ratio of zeolite:NH$_4$Cl:H$_2$O=1:0.3:10 and exchanged at 60° C. for 0.5 hour. To the slurry was added 0.13 L of the rare earth chloride solution having a concentration of 300 gRE$_2$O$_3$/L. The slurry was stirred evenly. To the slurry was added aqueous ammonia, and the slurry was adjusted to a pH of 7.8 and the stirring was continued for 10 minutes, filtered, water-washed, dried, then calcined in air at 570° C. for 2 hours to obtain the present rare earth-containing Y zeolite product, named as Y-B.

Y-B had a similar X-ray diffraction spectrogram as that shown in FIG. 1.

Y-B: Na$_2$O 1.5 wt %, rare earth oxide 11.9 wt %, crystallinity 50.6%, unit cell size 2.463 nm, the Si/Al atom ratio in the skeleton 2.9. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 54.1.

Example 3

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in a condition of 50% steam at 570° C. for 2 hours to obtain the "one-exchange-and-one-calcination" rare earth- and sodium-containing Y zeolite Y-C1, Y-C1 having the following chemical composition: Na$_2$O 4.9 wt %, rare earth oxide 9.9 wt %. Then a slurry was formulated and pulped in a ratio of zeolite:NH$_4$Cl:H$_2$O=1:0.15:12 and exchanged at 75° C. for 1 hour. Then to the slurry was added 0.27 L of the rare earth chloride solution having a concentration of 300 gRE$_2$O$_3$/L. The slurry was stirred evenly. To the slurry was added sodium silicate, and the slurry was adjusted to a pH of 8.0 and the stifling was continued for 10 minutes, filtered, water-washed, dried, then calcined in air at 570° C. for 2 hours to obtain the present rare earth-containing Y zeolite product, named as Y-C.

Y-C had a similar X-ray diffraction spectrogram as that shown in FIG. 1.

Y-C: Na$_2$O 1.3 wt %, rare earth oxide 13.9 wt %, crystallinity 48.8%, unit cell size 2.465 nm, the Si/Al atom ratio in the skeleton 3.1. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 55.6.

Example 4

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in air at 600° C. for 1.5 hours to obtain the "one-exchange-and-one-calcination" rare earth- and sodium-containing Y zeolite Y-D1, Y-D1 having the following chemical composition: Na$_2$O 4.9 wt %, rare earth oxide 9.9 wt %. Then Y-D1, ammonium chloride and the rare earth chloride solution having a concentration of 300 gRE$_2$O$_3$/L were mixed and pulped in a ratio of zeolite:NH$_4$Cl:RE$_2$O$_3$:H$_2$O=1:0.15:0.06:12 and exchanged at 75° C. for 1 hour. Then to the slurry was added sodium silicate, and the slurry was adjusted to a pH of 8.0 and the stirring was continued for 10 minutes, filtered, water-washed, dried, then calcined in a condition of 100% steam at 570° C. for 3 hours to obtain the present rare earth-containing Y zeolite product, named as Y-D.

Y-D had a similar X-ray diffraction spectrogram as that shown in FIG. 1.

Y-D: Na$_2$O 1.3 wt %, rare earth oxide 16.0 wt %, crystallinity: 46.6%, unit cell size: 2.467 nm, the Si/Al atom ratio in the skeleton 3.0. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 57.2.

Example 5

2.6 kg NaY zeolite and 20 kg deionized water were mixed and pulped. To the mixture was added 1.5 L of the rare earth chloride solution having a concentration of 160 gRE$_2$O$_3$/L. After stirring, the slurry was warmed up to 75° C. and the slurry was adjusted with a diluted hydrochloric acid to a pH of 3.5, continued to exchange for 1 hour, filtered, water-washed, dired, then calcined in a condition of 100% steam at 600° C. for 2 hours to obtain the "one-exchange-and-one-calcination" rare earth- and sodium-containing Y zeolite Y-E1, Y-E1 having the following chemical composition: Na$_2$O 4.8 wt %, rare earth oxide 11.9 wt %. Then a slurry was formulated and pulped in a ratio of zeolite:NH$_4$Cl:H$_2$O=1:0.3:10 and exchanged at 70° C. for 1 hour. Then to slurry was added 0.4 L of the rare earth chloride solution having a concentration of 300 gRE$_2$O$_3$/L. The slurry was stirred evenly. To the slurry was added aqueous ammonia, and the slurry was adjusted to a pH of 7.9 and the stirring was continued for 10 minutes, filtered, water-washed, dried, then calcined in a condition of 80% steam at 600° C. for 2 hours to obtain the present rare earth-containing Y zeolite product, named as Y-E.

Y-E had a similar X-ray diffraction spectrogram as that shown in FIG. 1.

Y-E: Na$_2$O 1.3 wt %, rare earth oxide 17.9 wt %, crystallinity 45.2%, unit cell size 2.467 nm, the Si/Al atom ratio in the skeleton 3.2. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 62.6.

Example 6

2.6 kg NaY zeolite and 20 kg deionized water were mixed and pulped. To the mixture was added 1.5 L of the lanthanum chloride solution having a concentration of 160 gLa$_2$O$_3$/L. After stirring, the slurry was warmed up to 75° C. and the slurry was adjusted with a diluted hydrochloric acid to a pH of 3.5, continued to exchange for 1 hour, filtered, water-washed, dired, then calcined in air at 620° C. for 2 hours to obtain the "one-exchange-and-one-calcination" rare earth- and sodium-containing Y zeolite Y-F1, Y-F1 having the following chemical composition: Na$_2$O 4.8 wt %, lanthanum oxide 11.9 wt %. Then Y-F1, ammonium chloride and the lanthanum chloride solution were mixed and pulped in a ratio of zeolite:NH$_4$Cl:La$_2$O$_3$:H$_2$O=1:0.18:0.10:12 and exchanged at 65° C. for 1 hour. To the slurry was added aqueous ammonia, and the slurry was adjusted to a pH of 8.2 and the stirring was continued for 10 minutes, filtered, water-washed, dried, then calcined in a condition of 100% steam at 620° C. for 3 hours to obtain the present rare earth-containing Y zeolite product, named as Y-F.

Y-F had a similar X-ray diffraction spectrogram as that shown in FIG. 1.

Y-F: Na$_2$O 1.5 wt %, lanthanum oxide 22.0 wt %, crystallinity 41.3%, unit cell size 2.470 nm, the Si/Al atom ratio in the skeleton 3.1. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 70.1.

Example 11

2.6 kg NaY zeolite (Qilu catalyst company, calcination loss by 22.5 wt %, Si/Al ratio 2.7, crystallinity 88%, the same below) and 15 kg deionized water were mixed and pulped. To the mixture were added 1.0 L of the rare earth chloride solution having a concentration of 160 gRE$_2$O$_3$/L and 0.24 kg ammonium chloride solid. After stirring, the slurry was warmed up to 70° C. and the slurry was adjusted with a diluted hydrochloric acid to a pH of 4.0, continued to exchange for 1.5 hours, filtered, water-washed, dired, then calcined in a condition of 100% steam at 550° C. for 2 hours to obtain the "one-exchange-and-one-calcination" rare earth- and sodium-containing Y zeolite YY-A1, YY-A1 having the following chemical composition: Na$_2$O 5.1 wt %, rare earth oxide 7.8 wt %. Then a slurry was formulated and pulped in a ratio of zeolite:NH$_4$Cl:H$_2$O=1:0.2:10 and exchanged at 70° C. for 1 hour. After filtering and water-washing, the resulting material was re-pulped and to the slurry was added 0.27 L of the rare earth chloride solution having a concentration of 300 gRE$_2$O$_3$/L. The slurry was stirred evenly. To the slurry was added aqueous ammonia, and the slurry was adjusted to a pH of 7.5 and the stifling was continued for 10 minutes, optionally filtered and water-washed, dried, then calcined in a condition of 100% steam at 600° C. for 2 hours to obtain the present rare earth-containing Y zeolite product, named as YY-A.

YY-A: Na$_2$O 1.5 wt %, rare earth oxide 11.8 wt %, crystallinity: 50.3%, unit cell size: 2.458 nm, the Si/Al atom ratio in the skeleton 3.5. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 89.7.

Example 12

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in air at 570° C. for 2 hours to obtain the "one-exchange-and-one-calcination" rare earth- and sodium-containing Y zeolite YY-B1, YY-B1 having the following chemical composition: Na$_2$O 4.9 wt %, rare earth oxide 9.9 wt %. Then a slurry was formulated and pulped in a ratio of zeolite:HCl:H$_2$O=1:0.05:10 and exchanged at 60° C. for 0.5 hour. After filtering and water-washing, the resulting material was re-pulped and to the slurry was added 0.13 L of the rare earth chloride solution having a concentration of 300 gRE$_2$O$_3$/L. The slurry was stirred evenly. To the slurry was added aqueous ammonia, and the slurry was adjusted to a pH of 7.8 and the stifling was continued for 10 minutes, optionally filtered and water-washed, dried, then calcined in air at 570° C. for 2 hours to obtain the present rare earth-containing Y zeolite product, named as YY-B.

YY-B: Na$_2$O 1.5 wt %, rare earth oxide 11.9 wt %, crystallinity 50.6%, unit cell size 2.463 nm, the Si/Al atom ratio in the skeleton 2.9. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 48.8.

Example 13

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in a condition of 50% steam at 570° C. for 2 hours to obtain the "one-exchange-and-one-calcination" rare earth- and sodium-containing Y zeolite YY-C1, YY-C1 having the following chemical composition: Na$_2$O 4.9 wt %, rare earth oxide 9.9 wt %. Then a slurry was formulated and pulped in a ratio of zeolite:NH$_4$Cl:H$_2$O=1:0.15:12 and exchanged at 75° C. for 1 hour. After filtering and water-washing, the resulting material was re-pulped and to the slurry was added 0.27 L of the rare earth chloride solution having a concentration of 300 gRE$_2$O$_3$/L. The slurry was stirred evenly. To the slurry was added sodium silicate, and the slurry was adjusted to a pH of 8.0 and the stirring was continued for 10 minutes, optionally filtered and water-washed, dried, then calcined in air at 570° C. for 2 hours to obtain the present rare earth-containing Y zeolite product, named as YY-C.

YY-C: Na$_2$O 1.3 wt %, rare earth oxide 13.9 wt %, crystallinity 48.8%, unit cell size 2.465 nm, the Si/Al atom ratio in the skeleton 3.1. The product of the ratio of the strength I$_1$ of the peak at 2θ=11.8±0.1° to the strength I$_2$ of the peak at 2θ=12.3±0.1° (I$_1$/I$_2$) and the weight percent of rare earth as rare earth oxide in the zeolite is 55.6.

Example 14

2.6 kg NaY zeolite and 18 kg deionized water were mixed and pulped. To the mixture were added 1.25 L of the rare earth chloride solution having a concentration of 160 gRE$_2$O$_3$/L and 0.12 kg ammonium chloride solid. After stirring, the slurry was warmed up to 80° C. and the slurry was adjusted with a diluted hydrochloric acid to a pH of 3.8, continued to exchange for 1 hour, filtered, water-washed, dried, then calcined in air at 600° C. for 1.5 hours to obtain the "one-exchange-and-one-calcination" rare earth- and sodium-containing Y zeolite YY-D1, YY-D1 having the following chemical composition: $Na_2O$ 4.9 wt %, rare earth oxide 9.9 wt %. Then a slurry was formulated and pulped in a ratio of zeolite:$NH_4Cl$:$H_2O$=1:0.15:12 and exchanged at 75° C. for 1 hour. After filtering and water-washing, the resulting material was re-pulped and to the slurry was added 0.4 L of the rare earth chloride solution having a concentration of 300 g$RE_2O_3$/L. The slurry was stirred evenly. To the slurry was added sodium silicate, and the slurry was adjusted to a pH of 8.0 and the stifling was continued for 10 minutes, optionally filtered and water-washed, dried, then calcined in a condition of 100% steam at 570° C. for 3 hours to obtain the present rare earth-containing Y zeolite product, named as YY-D.

YY-D: $Na_2O$ 1.3 wt %, rare earth oxide 15.9 wt %, crystallinity 46.9%, unit cell size 2.466 nm, the Si/Al atom ratio in the skeleton 3.0. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 57.2.

Example 15

2.6 kg NaY zeolite and 20 kg deionized water were mixed and pulped. To the mixture was added 1.5 L of the rare earth chloride solution having a concentration of 160 g$RE_2O_3$/L. After stirring, the slurry was warmed up to 75° C. and the slurry was adjusted with a diluted hydrochloric acid to a pH of 3.5, continued to exchange for 1 hour, filtered, water-washed, dried, then calcined in a condition of 100% steam at 600° C. for 2 hours to obtain the "one-exchange-and-one-calcination" rare earth- and sodium-containing Y zeolite YY-E1, YY-E1 having the following chemical composition: $Na_2O$ 4.8 wt %, rare earth oxide 11.9 wt %. Then a slurry was formulated and pulped in a ratio of zeolite:$NH_4Cl$:$H_2O$=1:0.3:10 and exchanged at 70° C. for 1 hour. After filtering and water-washing, the resulting material was re-pulped and to the slurry was added 0.4 L of the rare earth chloride solution having a concentration of 300 g$RE_2O_3$/L. The slurry was stirred evenly. To the slurry was added aqueous ammonia, and the slurry was adjusted to a pH of 7.9 and the stirring was continued for 10 minutes, optionally filtered and water-washed, dried, then calcined in a condition of 80% steam at 600° C. for 2 hours to obtain the present rare earth-containing Y zeolite product, named as YY-E.

YY-E: $Na_2O$ 1.3 wt %, rare earth oxide 17.9 wt %, crystallinity 45.2%, unit cell size 2.467 nm, the Si/Al atom ratio in the skeleton 3.2. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 62.6.

Example 16

2.6 kg NaY zeolite and 20 kg deionized water were mixed and pulped. To the mixture was added 1.5 L of the lanthanum chloride solution having a concentration of 160 g$La_2O_3$/L. After stirring, the slurry was warmed up to 75° C. and the slurry was adjusted with a diluted hydrochloric acid to a pH of 3.5, continued to exchange for 1 hour, filtered, water-washed, dried, then calcined in air at 620° C. for 2 hours to obtain the "one-exchange-and-one-calcination" rare earth- and sodium-containing Y zeolite YY-F1, YY-F1 having the following chemical composition: $Na_2O$ 4.8 wt %, lanthanum oxide 11.9 wt %. Then a slurry was formulated and pulped in a ratio of zeolite:oxalic acid:$H_2O$=1:0.08:12 and exchanged at 65° C. for 1 hour. After filtering and water-washing, the resulting material was re-pulped and to the slurry was added 0.67 L of the lanthanum chloride solution having a concentration of 300 g$La_2O_3$/L. The slurry was stirred evenly. To the slurry was added aqueous ammonia, and the slurry was adjusted to a pH of 8.2 and the stirring was continued for 10 minutes, optionally filtered and water-washed, dried, then calcined in a condition of 100% steam at 620° C. for 3 hours to obtain the present rare earth-containing Y zeolite product, named as YY-F.

YY-F: $Na_2O$ 1.5 wt %, lanthanum oxide 21.9 wt %, crystallinity 41.7%, unit cell size 2.470 nm, the Si/Al atom ratio in the skeleton 3.1. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 70.1.

Comparative Example 1

In this Comparative Example, the rare earth-containing Y zeolite was prepared according to the method disclosed in CN1053808A.

2.6 kg NaY zeolite, 1.75 L of the rare earth chloride solution (160 g$RE_2O_3$/L) and 30 kg deionized water were mixed. The slurry was adjusted to a pH of 3.5 and exchanged at 90° C. for 1 hour. After stirring and water-washing, the filtered cake was placed in a tube-furnace. Upon heating up to 200° C., steam was passed in. The heating-up was continued to 550° C., and the calcination was conducted for 2 hours. The resulting zeolite, $(NH_4)_2SO_4$ and $H_2O$ were pulped in a ratio of 1:0.2:40, and the slurry was exchanged at 60° C. for 15 mins, filtered and dried to obtain a comparative sample, named as DB-1.

Figure 2:
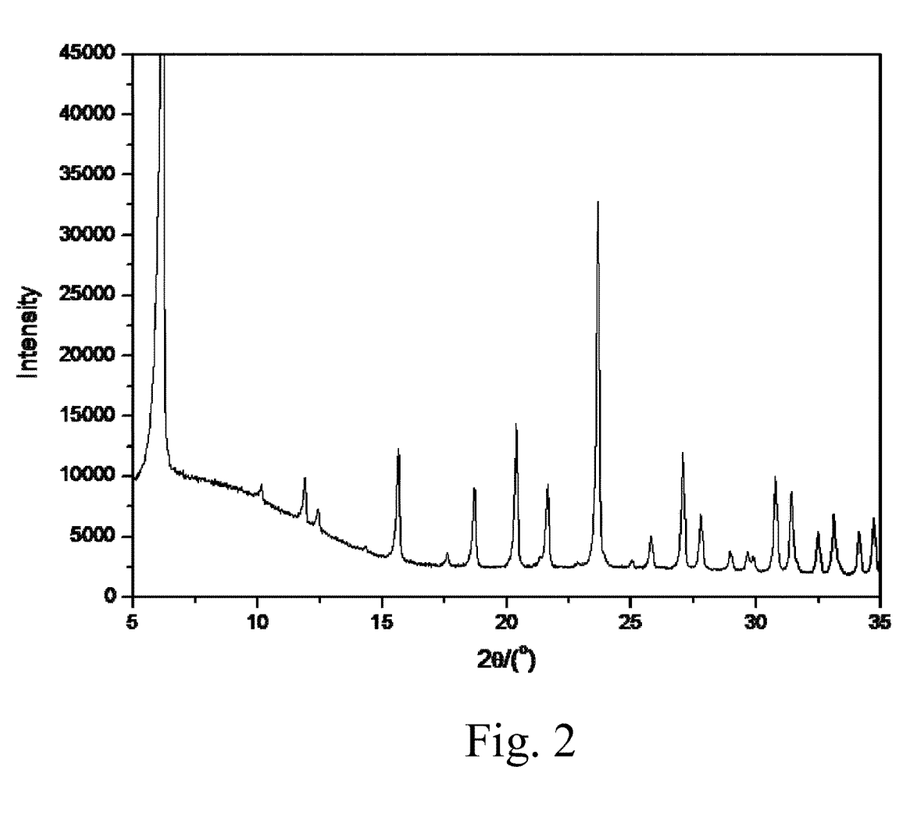
FIG. 2 is an X-ray diffraction spectrogram of the rare earth-containing Y zeolite prepared according to Comparative Example 1.

The X-ray diffraction spectrogram of DB-1 was shown in FIG. 2

DB-1: $Na_2O$ 1.3 wt %, rare earth oxide 12.1 wt %, crystallinity 56.7%, unit cell size 2.468 nm, the Si/Al atom ratio in the skeleton 4.2. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 15.7.

Comparative Example 2

In this Comparative Example, the rare earth-containing Y zeolite was prepared according to the conventional two-exchange-and-two-calcination method.

2.6 kg NaY zeolite, 3.0 L of the rare earth chloride solution (160 g$RE_2O_3$/L) and 20 kg deionized water were mixed, exchanged at 90° C. for 1 hour, filtered, water-washed, dried, calcined in air at 520° C. for 2 hours. The resulting zeolite, the rare earth chloride solution and $H_2O$ were pulped in a ratio of 1:0.12:10 and exchanged at 90° C. for 1 hour, filtered, dired, and calcined at 520° C. for 2 hours to obtain a comparative sample, named as DB-2.

DB-2 had a similar X-ray diffraction spectrogram as that shown in FIG. 2.

DB-2: $Na_2O$ 1.9 wt %, rare earth oxide 18.2 wt %, crystallinity 43.6%, unit cell size 2.469 nm, the Si/Al atom ratio in the skeleton 2.7. The product of the ratio of the strength $I_1$ of the peak at 2θ=11.8±0.1° to the strength $I_2$ of the peak at 2θ=12.3±0.1° ($I_1/I_2$) and the weight percent of rare earth as rare earth oxide in the zeolite is 16.4.

Comparative Example 3

In this Comparative Example, the rare earth-containing Y zeolite was prepared according to the method disclosed in CN100344374C.

2.6 kg NaY zeolite and 20 kg deionized water were mixed and warmed up to 90° C. To the slurry was added 0.3 kg ammonium sulfate, and the resulting slurry was adjusted with hydrochloric acid to a pH of 3.5-4.0. The exchange was conducted for 1 hour. After filtering, to the filtered cake was added 20 kg water and then added 2.87 L of the rare earth chloride solution (160 g$RE_2O_3$/L). The slurry was pulped and adjusted with hydrochloric acid to a pH of 3.5-5.5. The slurry was stirred at room temperature for 1 hour. Then to the slurry was added aqueous ammonia, and stirred for 5 mins. After water-washing and drying, the calcination was conducted at 540° C. in 0.1/h WHSV steam for 1.5 hours. The calcined zeolite was washed with the ammonium chloride solution in a ratio of zeolite:ammonium salt:water=1:0.1:10 at 60° C. for 10 mins, and dried to obtain a comparative sample, named as DB-3.

DB-3 had a similar X-ray diffraction spectrogram as that shown in FIG. 2.

DB-3: $Na_2O$ 0.2 wt %, rare earth oxide 20.6 wt %, crystallinity 50.7%, unit cell size 2.472 nm, the Si/Al atom ratio in the skeleton 3.7. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 26.8.

Comparative Example 4

In this Comparative Example, the rare earth-containing Y zeolite was prepared according to the method disclosed in CN100344374C.

2.6 kg NaY zeolite and 20 kg deionized water were mixed and pulped. To the slurry was added 1.63 L of the rare earth chloride solution (160 g$RE_2O_3$/L). The resulting slurry was stirred at 60° C. for 5 mins and adjusted with hydrochloric acid to a pH of 3.5-5.5. After continuing to stir for 1 hour, to the slurry was added aqueous ammonia. The slurry was stirred for 5 mins and filtered. After water-washing and drying, the calcination was conducted at 600° C. in 0.2/h WHSV steam for 1.5 hours. The calcined zeolite was washed with the ammonium chloride solution in a ratio of zeolite:ammonium salt:water=1:0.1:10 at 90° C. for 10 mins, and dried to obtain a comparative sample, named as DB-4.

DB-4 had a similar X-ray diffraction spectrogram as that shown in FIG. 2.

DB-4: $Na_2O$ 0.8 wt %, rare earth oxide 11.8 wt %, crystallinity 56.5%, unit cell size 2.465 nm, the Si/Al atom ratio in the skeleton 3.3. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 40.1.

Comparative Example 5

In this Comparative Example, the rare earth-containing Y zeolite was prepared according to the method disclosed in CN100344374C.

2.6 kg NaY zeolite and 20 kg deionized water were mixed and pulped. To the slurry was added 2.19 L of the rare earth chloride solution (160 g$RE_2O_3$/L). The resulting slurry was stirred at 60° C. for 5 mins and adjusted with hydrochloric acid to a pH of 3.5-5.5. After continuing to stir for 1 hour, to the slurry was added aqueous ammonia. The slurry was stirred for 5 mins and filtered. After water-washing and drying, the calcination was conducted at 550° C. in air for 1.5 hours. The calcined zeolite was washed with the ammonium chloride solution in a ratio of zeolite:ammonium salt:water=1:0.1:10 at 60° C. for 10 mins, and dried to obtain a comparative sample, named as DB-5.

DB-5 had a similar X-ray diffraction spectrogram as that shown in FIG. 2.

DB-5: $Na_2O$ 1.0 wt %, rare earth oxide 15.7 wt %, crystallinity 52.9%, unit cell size 2.467 nm, the Si/Al atom ratio in the skeleton 3.6. The product of the ratio of the strength $I_1$ of the peak at $2\theta=11.8\pm0.1°$ to the strength $I_2$ of the peak at $2\theta=12.3\pm0.1°$ ($I_1/I_2$) and the weight percent of rare earth as rare earth oxide in the zeolite is 30.9.

Example 21

In this example, the data about rare earth utilization of the rare earth-containing Y zeolites in Examples 1-6 and 11-16 and Comparative Examples 1-5 are summarized in Table 1.

TABLE 1

| Zeolite samples | Theoretical rare earth feeding amount/% | $RE_2O_3$ content in the product/% | Rare earth utilization/% |
|---|---|---|---|
| Y-A | 12.0 | 11.9 | 99.2 |
| Y-B | 12.0 | 11.9 | 99.2 |
| Y-C | 14.0 | 13.9 | 99.3 |
| Y-D | 16.0 | 16.0 | 100 |
| Y-E | 18.0 | 17.9 | 99.4 |
| Y-F | 22.0 | 22.0 | 100 |
| YY-A | 12.0 | 11.8 | 98.3 |
| YY-B | 12.0 | 11.9 | 99.2 |
| YY-C | 14.0 | 13.9 | 99.3 |
| YY-D | 16.0 | 15.9 | 99.4 |
| YY-E | 18.0 | 17.9 | 99.4 |
| YY-F | 22.0 | 21.9 | 99.5 |
| DB-1 | 14.0 | 12.1 | 86.4 |
| DB-2 | 24.0 | 18.2 | 75.8 |
| DB-3 | 23.0 | 20.6 | 89.6 |
| DB-4 | 13.0 | 11.8 | 90.7 |
| DB-5 | 17.5 | 15.7 | 89.7 |

It can be seen from the Table 1 that the rare earth utilization of each zeolite in the Examples is higher than 98%, while the rare earth utilization in Comparative Examples are lower. The rare earth utilization in Comparative Example 2 is only about 75%, others are substantially lower than 90%. By the process having the two-exchange-and-two-calcination in combination with the deposition of rare earth according to the present invention, the rare earth utilization is effectively increased, and the rare earth resource can be saved.

Example 22

This example will show the physiochemical data for the rare earth-containing Y zeolite of the present invention after 17 hours aging treatment at 800° C. in a condition of 100% steam.

The zeolites in the above Examples and Comparative Examples were mixed with the ammonium chloride solution, and exchanged until the content of $Na_2O$ is below 0.3 wt %. After filtering and drying, the zeolites were aged at 800° C. in a condition of 100% steam for 17 hours. The aged zeolites were measured for physical-chemical characterization and for the light oil micro-activity MA.

The conditions for the light oil micro-activity (MA) include:

zeolite loading: 2 g,
the feedstock: Dagang straight run light diesel fuel
the feedstock amount: 1.56 g,
the reaction temperature: 460° C.
The results are shown in Table 2.

TABLE 2

| Zeolite samples | RE$_2$O$_3$ Content/% | Unit Cell Size/nm | Crystallinity Retention/% | MA |
|---|---|---|---|---|
| Y-A | 11.8 | 2.436 | 45.7 | 63.3 |
| Y-B | 11.9 | 2.436 | 45.9 | 63.3 |
| Y-C | 13.8 | 2.438 | 46.0 | 65.0 |
| Y-D | 15.9 | 2.439 | 47.0 | 67.2 |
| Y-E | 17.9 | 2.441 | 47.8 | 70.0 |
| Y-F | 21.9 | 2.445 | 46.3 | 72.1 |
| YY-A | 11.7 | 2.436 | 45.4 | 63.0 |
| YY-B | 11.8 | 2.436 | 45.9 | 63.0 |
| YY-C | 13.8 | 2.438 | 46.0 | 65.0 |
| YY-D | 16.9 | 2.439 | 46.3 | 67.0 |
| YY-E | 17.9 | 2.441 | 47.8 | 70.0 |
| YY-F | 21.8 | 2.445 | 46.0 | 72.0 |
| DB-1 | 11.8 | 2.433 | 27.1 | 56.1 |
| DB-2 | 17.1 | 2.438 | 35.0 | 65.2 |
| DB-3 | 19.5 | 2.441 | 39.6 | 68.0 |
| DB-4 | 11.3 | 2.433 | 34.9 | 56.4 |
| DB-5 | 14.9 | 2.436 | 38.4 | 63.0 |

It can be seen from Table 2 that for the zeolites in Examples, after ammonium-exchanging and sodium-removal, their rare earth contents were substantially unchanged. This showed that the rare earth ions were mainly located in the sodalite cages of the zeolite and could not be reverse-exchanged out. The location of rare earth ions in sodalite cages had a significant stabilizing effect on the zeolite structure. The zeolites in Examples had a crystallinity retention of higher than 45%, and a light oil micro-activity higher than those in Comparative Examples having the comparable rare earth contents.

The invention claimed is:

1. A rare earth-containing Y zeolite, comprising a rare earth weight percentage as rare earth oxide of 10-25 wt %; a unit cell size of 2.440-2.472 nm; a crystallinity of 35-65%; a Si/Al atom ratio in the skeleton of 2.5-5.0; and a product of the ratio of the strength $l_1$ of the peak at 2θ=11.8±0.1° to the strength $l_2$ of the peak at 2θ=12.3±0.1° in the X-ray diffraction spectrogram of the zeolite and the number of the weight percentage of rare earth as rare earth oxide in the zeolite of higher than 55.

2. The rare earth-containing Y zeolite of claim 1, which has a crystallinity retention after 17 hours of aging treatment at 800° C. in a condition of 100% steam of greater than 45%.

3. The rare earth-containing Y zeolite according to claim 1, having a rare earth percentage as rare earth oxide of 11-23 wt %.

4. The rare earth-containing Y zeolite according to claim 1, having a unit cell size of 2.450-2.470nm.

5. The rare earth-containing Y zeolite according to claim 1, having a crystallinity of 40-60%.

6. A process for preparing the rare earth-containing Y zeolite according to claim 1, comprising:
(1) contacting a NaY zeolite and a rare earth solution comprising a rare earth compound or a mixed solution containing an ammonium salt and the rare earth compound to obtain a rare earth-and sodium-containing Y zeolite;
(2) subjecting the rare earth-and sodium-containing Y zeolite obtained in step (1) to filtering, washing with water, drying, and a first calcination to obtain a rare earth-and sodium-containing Y zeolite;
(3) forming a mixture containing the rare earth-and sodium-containing Y zeolite obtained from step (2) and a solution having the ammonium salt and the rare earth compound, and adjusting a pH of the mixture to 6 -10;
(4) subjecting the rare earth- and sodium-containing Y zeolite obtained from step (3)to filtering, washing with water, drying, and a second calcination to obtain the rare earth-containing Y zeolite.

7. The process according to claim 6, wherein the ammonium salt is selected from the group consisting of ammonium chloride, ammonium nitrate, ammonium carbonate, ammonium hydrogen carbonate, and mixtures thereof.

8. The process according to claim 6, wherein in step (1), the weight ratio of the rare earth solution (as rare earth oxide) to the NaY zeolite (on the dry basis) is 0.06-0.14, the weight ratio of the ammonium salt (as ammonium chloride) to the rare earth solution (as rare earth oxide) is 0-10, said ammonium salt is selected from the group consisting of ammonium chloride, ammonium nitrate, ammonium carbonate, ammonium hydrogen carbonate, and mixtures thereof, said contact is conducted at room temperature to 100° C. for at least 0.3hour.

9. The process according to claim 8, wherein the weight ratio of water:zeolite is controlled to 7-15, said contact is conducted at 70-95° C. for 0.5-1.5hours.

10. The process according to claim 6, wherein in step (2), said first calcination is conducted at 500-650° C., in a condition of 0-100% steam for at least 0.5 hour.

11. The process according to claim 10, said first calcination is conducted at 550-620° C., in a condition of 0-100% steam for 1.5-3.0hours.

12. The process according to claim 6, wherein in step (3), the step of forming the mixture further comprises mixing the rare earth-and sodium-containing Y zeolite obtained from step (2) first with an ammonium salt solution comprising the ammonium salt and then with an rare earth solution comprising the rare earth compound.

13. The process according to claim 6, wherein in step (3), the pH of the mixture is adjusted using an alkaline liquid selected from the group consisting of aqueous ammonia, sodium silicate, sodium metaaluminate, sodium hydroxide, and mixtures thereof.

14. The process according to claim 13, wherein said alkaline liquid can be selected from the group consisting of aqueous ammonia, sodium silicate, sodium metaaluminate, sodium hydroxide and any mixture thereof.

15. The process according to claim 13, wherein in step (3), after the contact, the mixture is adjusted with an alkaline liquid to a pH of 7.5-8.2.

16. The process according to claim 6, wherein in step (4), said second calcination is conducted at 500-650° C., in a condition of 0-100% steam for 0.5-4hours.

17. The process according to claim16, wherein in step (4), said second calcination is conducted at 500-650° C., in a condition of 0-100% steam for 1-3hours.

18. The process according to claim 6, wherein in step (3), the step of forming the mixture further comprises mixing the rare earth-and sodium-containing Y zeolite obtained from step (2) with a pre-mixed solution containing the ammonium salt and the rare earth compound.

* * * * *